United States Patent [19]

Meinke

[11] 4,002,378

[45] Jan. 11, 1977

[54] VERTICALLY SUPPORTED ROTARY BODY

[75] Inventor: Peter Meinke, Grobinzemoos, Germany

[73] Assignee: Maschinenfabrik Augsburg Nurnberg Aktiengesellschaft, Munich, Germany

[22] Filed: Jan. 20, 1975

[21] Appl. No.: 542,154

[30] Foreign Application Priority Data

Jan. 24, 1974 Germany .......................... 2403293

[52] U.S. Cl. .................................. 308/147; 308/10
[51] Int. Cl.² ................. F16C 13/06; F16C 15/00; F16C 17/08; F16C 19/12
[58] Field of Search ............ 308/10, 141, 142, 143, 308/144, 145, 146, 147, 230

[56] References Cited

UNITED STATES PATENTS

| 1,651,683 | 12/1927 | Eley | 308/141 X |
|---|---|---|---|
| 3,097,167 | 7/1963 | Beyerle | 308/143 X |
| 3,508,444 | 4/1970 | Sitomer et al. | 308/10 X |
| 3,537,765 | 11/1970 | Lagerwey | 308/142 |
| 3,731,984 | 5/1973 | Habermann | 308/10 |
| 3,747,998 | 7/1973 | Klein et al. | 308/10 |

FOREIGN PATENTS OR APPLICATIONS

| 1,120,986 | 7/1962 | Germany | 308/146 |
|---|---|---|---|
| 1,143,150 | 3/1963 | Germany | 308/230 |

Primary Examiner—L. J. Paperner
Assistant Examiner—Howard Beltran
Attorney, Agent, or Firm—Alan H. Levine

[57] ABSTRACT

A rotary body supported at one or both ends by bearing means, either the body or a bearing means being resilient. An extension is located between each end of the rotary body and its respective bearing means, the extension having a smaller diameter than the rotary body and rotatable with the body. The mass per unit axial length of the extension is smaller than the mass per unit length of the rotary body.

4 Claims, 3 Drawing Figures

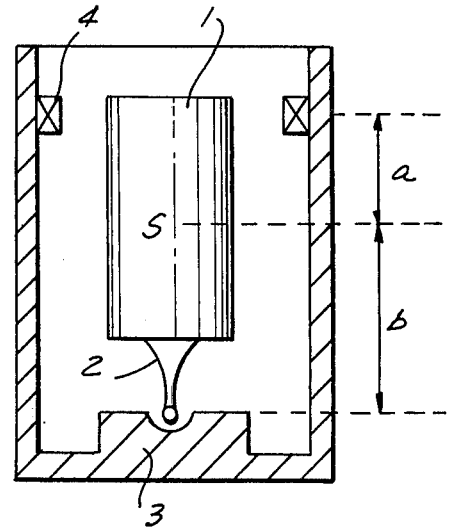
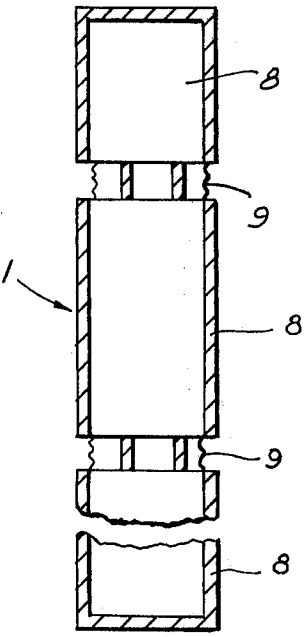
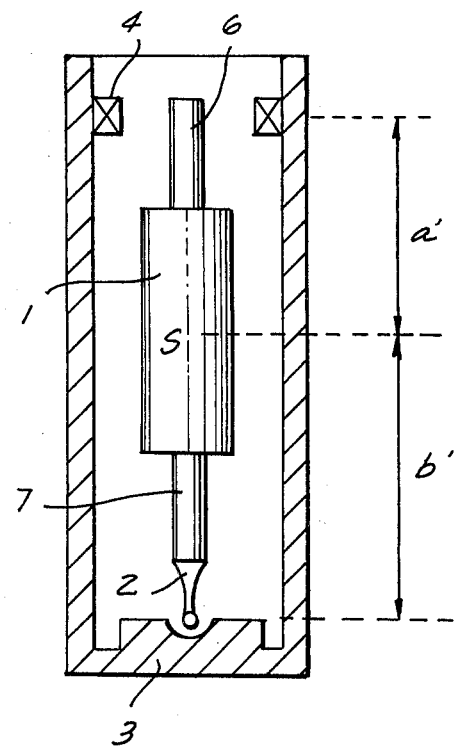

VERTICALLY SUPPORTED ROTARY BODY

The present invention relates to a single - or multi-member rotary body which is supported at one or both ends, and in which either the rotary body or at least one of the bearings must be resilient.

Rotary bodies of the aforementioned type possess weakly-damped eigenvalues, particularly at very high speeds of rotation, and therefore have a tendency toward perturbed motions and oscillations which, in particular, deflect the ends of a single-member rotor or the ends of a rotor section of a multi-member rotor. As a result, the rotor or its sections experience a nutational movement of first or higher order around its center of gravity or the centers of gravity of the corresponding parts. This motion must be counteracted by the radial restoring forces of the support in order for the rotor again to assume its central position.

Up to now it has been attempted to apply the restoring moments necessary for the dampening of the nutational movements by high restoring forces and it was therefore necessary to design the supports to withstand high radial forces. This measure has in part been unsuccessful, i.e., in the case of hemispherical thrust bearings in which high radial forces produce travel to one side, and in part even the movement of the journal pin out of the bearing socket which can lead to the destruction of bearing and rotor. In other cases the high radial forces made bearing supports uneconomical; for this reason in certain cases the use of magnetic bearings, otherwise advantageous, was made impossible.

It is an object of the present invention to reduce the radial forces which occur in the bearing as a result of deflections produced during movement of a rotary body.

This objective is achieved, in accordance with the invention,, by arranging between the end of the rotary body and the corresponding bearing an axially extending extension which rotates with and has a similar diameter than the rotary body. When nutation oscillations develop, a restoring moment is necessary for correcting the movement of a rotary body; therefore, the lengthening of the distance between the bearing and the center of gravity of the rotary body causes the radial bearing forces to become smaller.

In accordance with one embodiment, it is advantageous that the weight of the extension not shift the center of gravity of the rotor towards the support point.

The manner of operation of the invention will be described on the basis of an example shown in the drawings, in which:

FIG. 1 is a schematic illustration of a rotary body without extensions according to this invention;

FIG. 2 is a schematic illustration of a rotary body with extensions according to this invention and FIG. 3 is a schematic illustration of a multi-member body.

A rotary body 1, having a center of gravity S, is supported by a flexible tapered pin 2 arranged in a socket 3. The upper end of the rotary body 1 is resiliently centered in dampening fashion by an active magnetic bearing 4. The distance between the center of gravity S and the median planes of the bearings 3 and 4 is designated by $b$ and $a$, respectively (FIG. 1).

FIG. 2 shows the same rotary body as shown in FIG. 1, but extended upwardly and downwardly by the extensions 6 and 7, respectively. In this arrangement, the center of gravity S is displaced only insignificantly, but the distances between the center of gravity S and the planes of bearings 3 and 4 are increased in each case by the length of the extensions to $b'$ and $a'$, respectively. Nutation oscillations which occur, and which otherwise as in (FIG. 1) are very difficult to control, are in this way definitely better damped.

FIG. 3 shows an alternative type of rotary body 1 comprising a plurality of axially aligned hollow rigid cylinders 8. Each two successive cylinders are joined together by a corrugated tube 9, serving as a flexible joint to allow axial bending of the rotary body. Such a body comprising cylinders 8 may be used in place of the body 1 shown in either of FIGS. 1 or 2, all the other parts shown in those figures remaining the same.

What is claimed is:

1. A rotational arrangement comprising a rotary body, support means resiliently supporting said rotary body at least at one of its ends, and a rigid extension means between the end of said rotary body and said support means for reducing the radial forces produced on said support means during rotation of said body, said extension means being rotatable with said rotary body and having a substantially smaller diameter than said rotary body, the mass per unit axial length of said extension means being less than the mass per unit axial length of said rotary body, so as to minimize any displacement of the center of gravity of said combined rotary body and extension means as compared to the center of gravity of said rotary body alone, said extension means having its only support at said support means, whereby the radial restoring forces on said support means is reduced.

2. A rotational arrangement as defined in claim 1 wherein said rotary body includes only a single member.

3. A rotational arrangement as defined in claim 1 wherein said rotary body includes a plurality of members.

4. A rotational arrangement as defined in claim 1 including bearing means supporting said rotary body at both of its ends, and an extension between each end of said body and its respective bearing means, each extension being rotatable with said body and having a smaller diameter than said body, the mass per unit axial length of each of said extensions being less than the mass per unit length of said rotary body.

* * * * *